(12) United States Patent
Saito et al.

(10) Patent No.: US 11,807,217 B2
(45) Date of Patent: Nov. 7, 2023

(54) CONTROL APPARATUS, COMPUTER-READABLE STORAGE MEDIUM, AND SYSTEM

(71) Applicant: HONDA MOTOR CO., LTD., Tokyo (JP)

(72) Inventors: Takeshi Saito, Tokyo (JP); Takanori Nakashima, Tokyo (JP); Tomohiro Shibata, Tokyo (JP); Masashi Eto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 71 days.

(21) Appl. No.: 17/351,215

(22) Filed: Jun. 17, 2021

(65) Prior Publication Data

US 2021/0394743 A1 Dec. 23, 2021

(30) Foreign Application Priority Data

Jun. 18, 2020 (JP) .................................. 2020-105289

(51) Int. Cl.
 *B60W 20/40* (2016.01)
 *B60W 20/12* (2016.01)
 (Continued)

(52) U.S. Cl.
 CPC ............ *B60W 20/40* (2013.01); *B60W 10/06* (2013.01); *B60W 10/08* (2013.01); *B60W 20/12* (2016.01);
 (Continued)

(58) Field of Classification Search
 CPC ...... B60W 20/40; B60W 20/12; B60W 10/06; B60W 10/08; B60W 40/04; B60W 40/06;
 (Continued)

(56) References Cited

U.S. PATENT DOCUMENTS

2009/0319107 A1 12/2009 Soma
2013/0024061 A1 1/2013 Yagura
(Continued)

FOREIGN PATENT DOCUMENTS

CN 101516707 A 8/2009
CN 102887145 A 1/2013
(Continued)

OTHER PUBLICATIONS

Machine Translation of EP1366949A1 PDF File Name: "EP1366949A1_Machine_Translation.pdf".*
(Continued)

*Primary Examiner* — Grant Moubry
*Assistant Examiner* — Ruben Picon-Feliciano (57) ABSTRACT

Provided is a control apparatus including a travelling control unit configured to control an engine travelling and a non-engine travelling of a hybrid vehicle, and perform switching from the non-engine travelling to the engine travelling in a case where a depression amount of an accelerator of the hybrid vehicle exceeds a predetermined depression threshold while the hybrid vehicle travels based on the non-engine travelling, and a switching suppression unit configured to suppress the switching from the non-engine travelling to the engine travelling by the travelling control unit while the hybrid vehicle travels in a short time depression area where depression of the accelerator does not continue for a period equal to or longer than a predetermined period of time.

16 Claims, 7 Drawing Sheets

(51) Int. Cl.
  *B60W 40/105* (2012.01)
  *B60W 10/06* (2006.01)
  *B60W 40/04* (2006.01)
  *B60W 40/06* (2012.01)
  *B60W 10/08* (2006.01)

(52) U.S. Cl.
  CPC ............ *B60W 40/04* (2013.01); *B60W 40/06* (2013.01); *B60W 40/105* (2013.01); *B60W 2540/103* (2013.01); *B60W 2556/45* (2020.02)

(58) Field of Classification Search
  CPC ........... B60W 40/105; B60W 2556/45; B60W 2540/103
  See application file for complete search history.

(56) References Cited

U.S. PATENT DOCUMENTS

2014/0365057 A1 12/2014 Arita
2016/0368479 A1 12/2016 Kim

FOREIGN PATENT DOCUMENTS

| CN | 103832432 A | * | 6/2014 | ............ B60K 6/48 |
| EP | 1366949 A1 | * | 12/2003 | ............ B60K 6/44 |
| JP | H09154205 A | | 6/1997 | |
| JP | 2003343303 A | | 12/2003 | |
| JP | 2013154665 A | | 8/2013 | |
| WO | 2013111828 A1 | | 8/2013 | |

OTHER PUBLICATIONS

Machine Translation of CN103832432A PDF File Name: "CN103832432A_Machine_Translation.pdf".*

Office Action issued for counterpart Japanese Application No. 2020-105289, issued by the Japanese Patent Office dated Aug. 29, 2023 (drafted on Aug. 24, 2023).

Office Action issued for counterpart Chinese Application 202110663488.6, issued by The State Intellectual Property Office of People's Republic of China dated Aug. 30, 2023.

* cited by examiner

CONTROL APPARATUS, COMPUTER-READABLE STORAGE MEDIUM, AND SYSTEM

The contents of the following Japanese application are incorporated herein by reference:
NO. 2020-105289 filed in JP on Jun. 18, 2020

BACKGROUND

1. Technical Field

The present invention relates to a control apparatus, a computer-readable storage medium, and a system.

2. Related Art

Patent document 1 describes that switching from a hybrid electric vehicle (HEV) mode to an electric vehicle (EV) mode is performed without a delay time in a case where a vehicle does not belong to an accelerator depression area.

CITATION LIST

Patent Document

[Patent document 1] International Publication No. 2013/111828

DESCRIPTION OF EXEMPLARY EMBODIMENTS

Hereinafter, the present invention will be described by way of exemplary embodiments of the invention, but the following embodiments are not intended to restrict the invention according to the claims. In addition, not all combinations of features described in the embodiments necessarily have to be essential to solving means of the invention.

Figure 1:
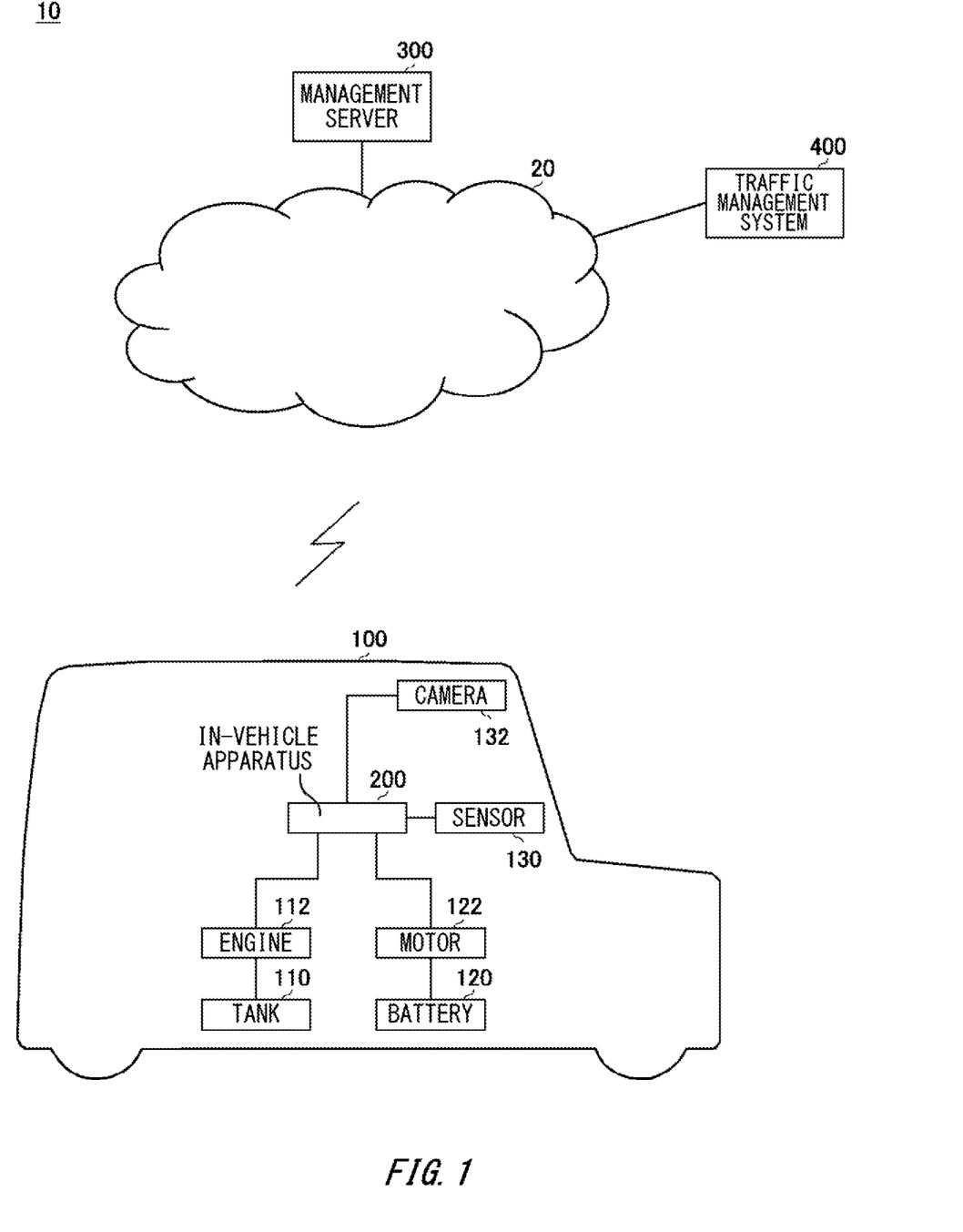
FIG. 1 schematically illustrates one example of a system 10.

FIG. 1 schematically illustrates one example of a system 10. The system 10 is provided with an in-vehicle apparatus 200 and a management server 300. The system 10 may be provided with a hybrid vehicle 100.

The in-vehicle apparatus 200 is mounted to the hybrid vehicle 100. The in-vehicle apparatus 200 is configured to control the hybrid vehicle 100.

The hybrid vehicle 100 is provided with a tank 110, an engine 112, a battery 120, a motor 122, a sensor 130, and a camera 132. The engine 112 is driven using a fuel in the tank 110. The motor 122 is driven using electrical power of the battery 120.

The sensor 130 is configured to output information associated with the hybrid vehicle 100. For example, the sensor 130 detects and outputs a speed of the hybrid vehicle 100. For example, the sensor 130 detects and outputs an acceleration of the hybrid vehicle 100.

The camera 132 is configured to perform image-capturing of a surrounding of the hybrid vehicle 100. The camera 132 may perform the image-capturing of a front side of the hybrid vehicle 100. The camera 132 may be a so-called drive recorder.

The hybrid vehicle 100 can execute an engine travelling using the engine 112, and a non-engine travelling without using the engine 112.

In a case where the hybrid vehicle 100 is a parallel hybrid vehicle, the engine travelling may be a travelling method in which the engine 112 is operated, and travelling is performed by driving the motor 122 using electrical power generated by driving an electric generator by the engine 112. The engine travelling may be a travelling method of rotating a driveshaft by power of the engine 112. The engine travelling may be a travelling method in which the travelling is performed by combining the power of the engine 112 with power of the motor 122. The non-engine travelling may be a travelling method in which the travelling is performed by driving the motor 122 using electrical power of the battery 120 without operating the engine 112.

In a case where the hybrid vehicle 100 is a series hybrid vehicle, the engine travelling may be a travelling method in which the engine 112 is operated, and the travelling is performed by driving the motor 122 using the electrical power generated by driving the electric generator. The non-engine travelling may be a travelling method in which the travelling is performed by driving the motor 122 using the electrical power of the battery 120 without operating the engine 112.

In a case where the hybrid vehicle 100 is a series-parallel hybrid vehicle, the engine travelling may be a travelling method in which the engine 112 is operated, and the travelling is performed by driving the motor 122 using the electrical power generated by driving the electric generator by the engine 112, the travelling method of rotating the driveshaft by the power of the engine 112, or the travelling method in which the travelling is performed by combining the power of the engine 112 with the power of the motor 122. The non-engine travelling may be a travelling method in which the travelling is performed by driving the motor 122 using the electrical power of the battery 120 without operating the engine 112.

In a related-art hybrid vehicle, in a case where a depression time of an accelerator exceeds a preset set time while the non-engine travelling is performed, control has been performed for automatically switching from the non-engine travelling to the engine travelling. In this manner, for example, when the depression time is longer than the set time while the hybrid vehicle is about to climb an upward slope, the switching to the engine travelling is automatically performed, and it is possible to increase driving force. However, for example, in a case where the switching to the engine travelling is performed in response to a state where the depression time is longer than the set time when the hybrid vehicle starts to climb a relatively short upward slope, the upward slope immediately ends. In this case, it is not necessary to increase the driving force, and as a result, the switching to the engine travelling is unnecessarily performed.

The in-vehicle apparatus 200 according to the present embodiment is configured to suppress the switching from the non-engine travelling to the engine travelling while the hybrid vehicle 100 travels in a short time depression area registered as an area where depression of the accelerator does not continue for a period of time equal to or longer than the set time. The in-vehicle apparatus 200 may be one example of a control apparatus. In this manner, in a scene where the switching to the engine travelling is not necessary, it is possible to suppress the switching from the non-engine travelling to the engine travelling, which can contribute to improvement in fuel efficiency, and also driving comfort can be enhanced.

The in-vehicle apparatus 200 receives information of the short time depression area from the management server 300, for example. The in-vehicle apparatus 200 may receive map data including the information of the short time depression area from the management server 300. The in-vehicle apparatus 200 may communicate with the management server 300 via a network 20.

The network 20 may be any network. The network 20 includes, for example, a mobile communication network such as so-called 3G (3rd Generation), LTE (Long Term Evolution), 4G (4th Generation), and 5G (5th Generation). The network 20 may include a so-called Wi-Fi (registered trademark) (Wireless Fidelity) network. The network 20 may include the Internet.

The management server 300 may specify the short time depression area using various types of methods. The management server 300 specifies the short time depression area based on, for example, information collected from a plurality of the hybrid vehicles 100. For example, the management server 300 generates depression statistics information by collecting a depression position of the accelerator and a depression time of the accelerator from each of the plurality of hybrid vehicles 100. Then, the management server 300 specifies the short time depression area based on the depression statistics information. For example, the management server 300 analyzes the depression statistics information, and specifies an area where there is a tendency that the depression time of the accelerator does not exceed the set time as the short time depression area.

The management server 300 may specify the short time depression area based on map information including a terrain of a road. For example, the management server 300 specifies an area where a length of an upward slope is shorter than a predetermined length as the short time depression area. In addition, for example, the management server 300 specifies an area, like a merging point of Metropolitan Expressway, where the accelerator needs to be depressed before merging and then the depression of the accelerator is released after the merging, as the short time depression area.

The management server 300 may specify the short time depression area for a specific hybrid vehicle 100. For example, the management server 300 specifies the short time depression area for the specific hybrid vehicle 100 based on information received via the network 20 from a traffic management system 400 configured to manage a traffic situation.

The traffic management system 400 may manage a position and a speed of a vehicle travelling on a road. The traffic management system 400 may manage a state of a traffic light on the road.

The management server 300 may specify the short time depression area for a target hybrid vehicle 100 based on a traffic situation ahead of the target hybrid vehicle 100. For example, the management server 300 specifies the short time depression area based on a travelling speed of a vehicle travelling ahead of the target hybrid vehicle 100. As a specific example, in a case where the vehicle travelling ahead of the target hybrid vehicle 100 decelerates, the management server 300 specifies an area between the vehicle and the target hybrid vehicle 100 as the short time depression area. In this manner, the switching from the non-engine travelling to the engine travelling can be avoided even after a driver of the hybrid vehicle 100 depresses the accelerator without realizing that the front vehicle has decelerated, and releases the depression since the hybrid vehicle 100 approaches the front vehicle.

In addition, for example, the management server 300 specifies the short time depression area based on a situation of a traffic light ahead of the target hybrid vehicle 100. As a specific example, in a case where a traffic light ahead of the target hybrid vehicle 100 is a red light, the management server 300 specifies an area between the traffic light and the target hybrid vehicle 100 as the short time depression area. In this manner, in a situation where the driver of the hybrid vehicle 100 is not capable of visually checking the traffic light, the switching from the non-engine travelling to the engine travelling can be avoided even after the driver depresses the accelerator, and releases the depression since the driver realizes the red light. In addition, in a case where it is predicted that the traffic light ahead of the target hybrid vehicle 100 changes from a green light to a red light before the target hybrid vehicle 100 passes therethrough, the management server 300 specifies an area between the traffic light and the target hybrid vehicle 100 as the short time depression area.

In this manner, the switching from the non-engine travelling to the engine travelling can be avoided even after the driver of the hybrid vehicle 100 depresses the accelerator so as to pass through the traffic light still indicating green, and releases the depression since the traffic light turns to red.

Figure 2:
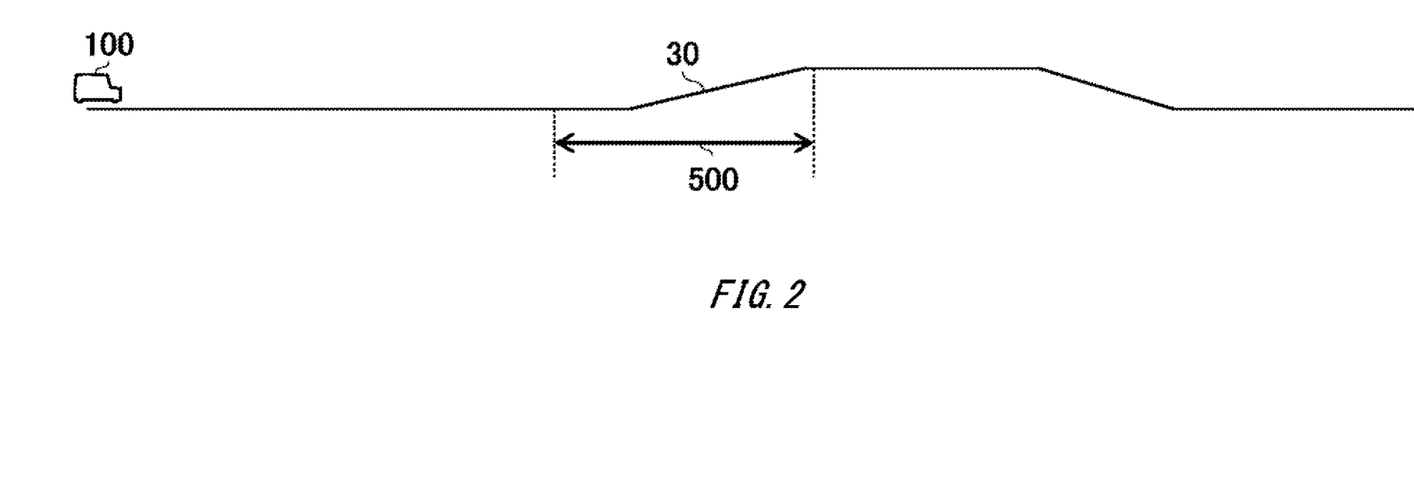
FIG. 2 is an explanatory diagram for describing travelling control by an in-vehicle apparatus 200.

FIG. 2 is an explanatory diagram for describing travelling control by the in-vehicle apparatus 200. In an example illustrated in FIG. 2, a case is exemplified where a slope 30 shorter than a predetermined length and an area in front of the slope 30 are registered as a short time depression area 500.

In normal circumstances, the driver of the hybrid vehicle 100 depresses the accelerator ahead of the slope 30. However, in the example illustrated in FIG. 2, the slope 30 is short, and even if the switching from the non-engine travelling to the engine travelling is performed as in the related-art hybrid vehicle 100 since the depression time exceeds the set time, the hybrid vehicle 100 immediately completes climbing the slope 30. In contrast, in accordance with the in-vehicle apparatus 200 according to the present embodiment, even when the depression time of the accelerator exceeds the set time in the short time depression area 500, the switching from the non-engine travelling to the engine travelling is suppressed, so that it is possible to suppress the unnecessary switching to the engine travelling.

Figure 3:
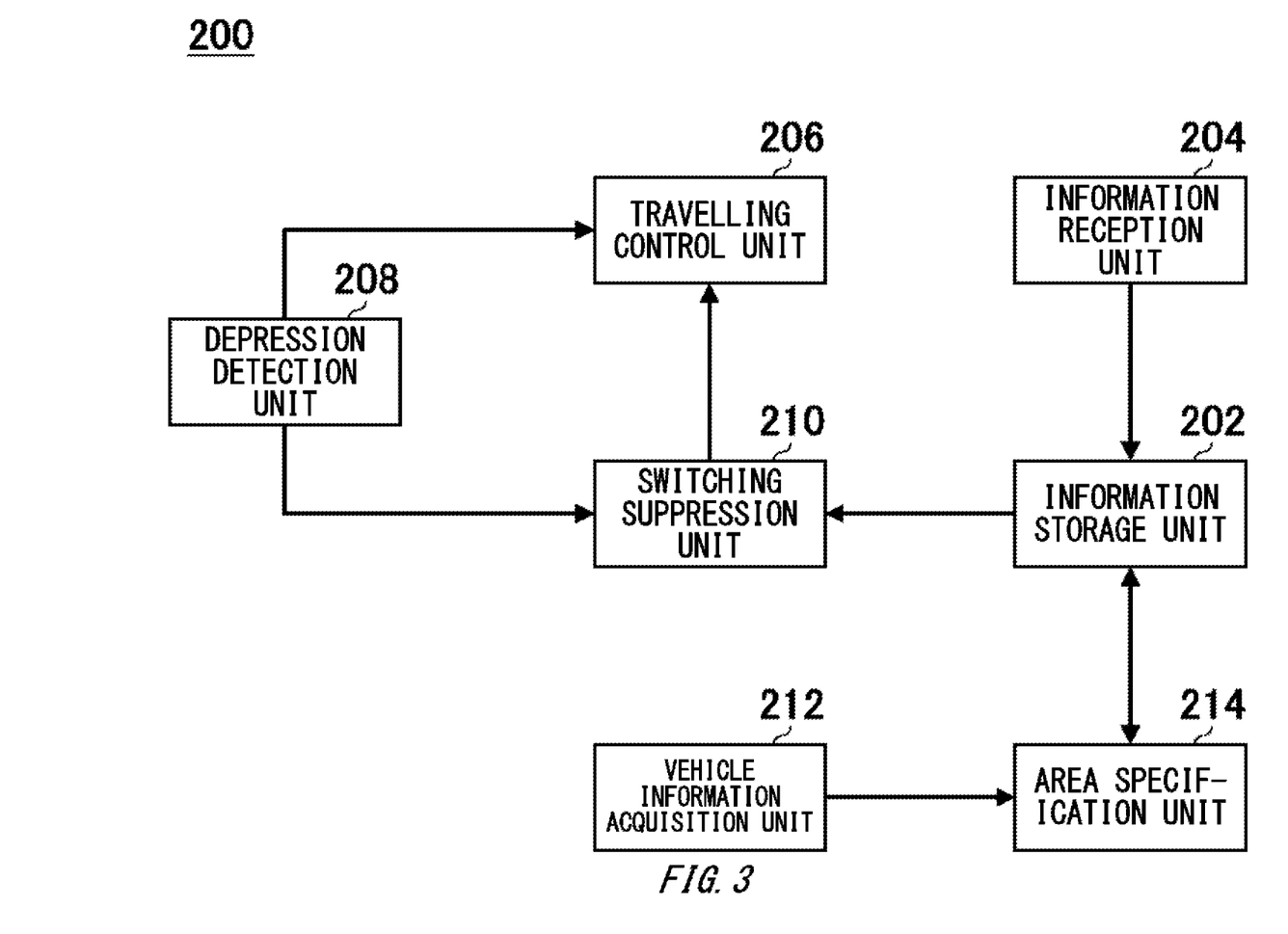
FIG. 3 schematically illustrates one example of a functional configuration of the in-vehicle apparatus 200.

FIG. 3 schematically illustrates one example of a functional configuration of the in-vehicle apparatus 200. The in-vehicle apparatus 200 is provided with an information storage unit 202, an information reception unit 204, a travelling control unit 206, a depression detection unit 208, a switching suppression unit 210, a vehicle information acquisition unit 212, and an area specification unit 214.

The information storage unit 202 is configured to store various types of information. The information storage unit 202 may store information of the short time depression area. The information storage unit 202 may store map data including the information of the short time depression area.

The information reception unit 204 is configured to receive various types of information. The information reception unit 204 may receive various types of information from the management server 300. The information reception unit 204 receives, for example, the information of the short time depression area from the management server 300. The information reception unit 204 may receive map data including the information of the short time depression area from the management server 300.

The travelling control unit 206 is configured to control the engine travelling and the non-engine travelling. The depression detection unit 208 is configured to detect depression of an accelerator of its own vehicle. The travelling control unit 206 performs the switching from the non-engine travelling to the engine travelling in a case where the depression time of the accelerator of its own vehicle exceeds a preset set time while its own vehicle travels based on the non-engine travelling.

The switching suppression unit 210 is configured to suppress the switching from the non-engine travelling to the engine travelling by the travelling control unit 206. The switching suppression unit 210 refers to the information of the short time depression area which is stored in the information storage unit 202, and suppresses the switching from the non-engine travelling to the engine travelling by the travelling control unit 206 while its own vehicle travels in the short time depression area.

For example, the switching suppression unit 210 prohibits the switching from the non-engine travelling to the engine travelling by the travelling control unit 206 while its own vehicle travels in the short time depression area. In this manner, in the short time depression area, even when the accelerator is depressed for a long period of time, the switching from the non-engine travelling to the engine travelling can be avoided.

In addition, for example, the switching suppression unit 210 may performs control to set the set time in the travelling control unit 206 to be longer while its own vehicle travels in the short time depression area as compared with a case where its own vehicle travels in an area other than the short time depression area. In this manner, the switching from the non-engine travelling to the engine travelling can be less likely to occur in the short time depression area as compared with the other area. In addition, the switching from the non-engine travelling to the engine travelling can be permitted in a case where the depression of the accelerator continues for a long period of time even in the short time depression area.

The vehicle information acquisition unit 212 is configured to acquire information associated with its own vehicle. The vehicle information acquisition unit 212 may acquire information output by the sensor 130. The vehicle information acquisition unit 212 acquires, for example, a speed of its own vehicle. The vehicle information acquisition unit 212 acquires, for example, an acceleration of its own vehicle. The vehicle information acquisition unit 212 may acquire a captured image obtained by image-capturing performed by the camera 132.

The area specification unit 214 is configured to specify the short time depression area. The area specification unit 214 specifies the short time depression area based on map information including a terrain of a road, for example. For example, the area specification unit 214 specifies an area where a length of an upward slope is shorter than a predetermined length as the short time depression area, for example. In addition, for example, the area specification unit 214 specifies an area, like a merging point of Metropolitan Expressway, where the accelerator needs to be depressed before merging and then the depression of the accelerator is released after the merging, as the short time depression area. The map information including the terrain of the road may be received by the information reception unit 204 from the management server 300, and may be stored in the information storage unit 202. In this manner, the switching from the non-engine travelling to the engine travelling can be suppressed in an area with a high probability that the depression of the accelerator does not continue for a long period of time.

For example, the area specification unit 214 specifies the short time depression area based on depression statistics information including depression positions of accelerators and depression times of the accelerators by a plurality of hybrid vehicles. For example, the area specification unit 214 analyzes the depression statistics information, and specifies an area where there is a tendency that the depression time of the accelerator does not exceed the set time as the short time depression area. The depression statistics information may be received by the information reception unit 204 from the management server 300, and may be stored in the information storage unit 202. In this manner, the switching from the non-engine travelling to the engine travelling can be suppressed in an area where there is a tendency that many drivers depress the accelerator for a short period of time due to any reason such as a situation in a surrounding of the road without an objective reason such as a terrain.

The switching suppression unit 210 may decide whether the switching from the non-engine travelling to the engine travelling by the travelling control unit 206 is suppressed according to a speed of its own vehicle. For example, when the depression of the accelerator continues for a set time or longer while its own vehicle travels in the short time depression area, the switching suppression unit 210 does not suppress the switching in a case where the speed of its own vehicle is slower than a speed limit of the road by a value equal to or higher than a predetermined value, and on the other hand suppresses the switching in a case where the speed of its own vehicle is not slower than the speed limit of the road by the value equal to or higher than the predetermined value. In this manner, for example, in a case where its own vehicle travelling at 30 km/h enters a lane set at 100 km/h, necessary driving force can be acquired by switching to the engine travelling without suppressing the switching, and for example, in a case where its own vehicle travelling at 80 km/h enters the lane set at 100 km/h, the switching can be suppressed since it is regarded that the depression is to end in a short period of time.

The switching suppression unit 210 may decide whether the switching from the non-engine travelling to the engine travelling by the travelling control unit 206 is suppressed according to an acceleration of its own vehicle. For example, when the depression time of the accelerator of its own vehicle exceeds a set time while its own vehicle travels in the short time depression area, the switching suppression unit 210 suppresses the switching in a case where the acceleration of its own vehicle is lower than a predetermined acceleration threshold, and on the other hand does not suppress the switching in a case where the acceleration of its own vehicle is higher than the acceleration threshold.

Figure 4:
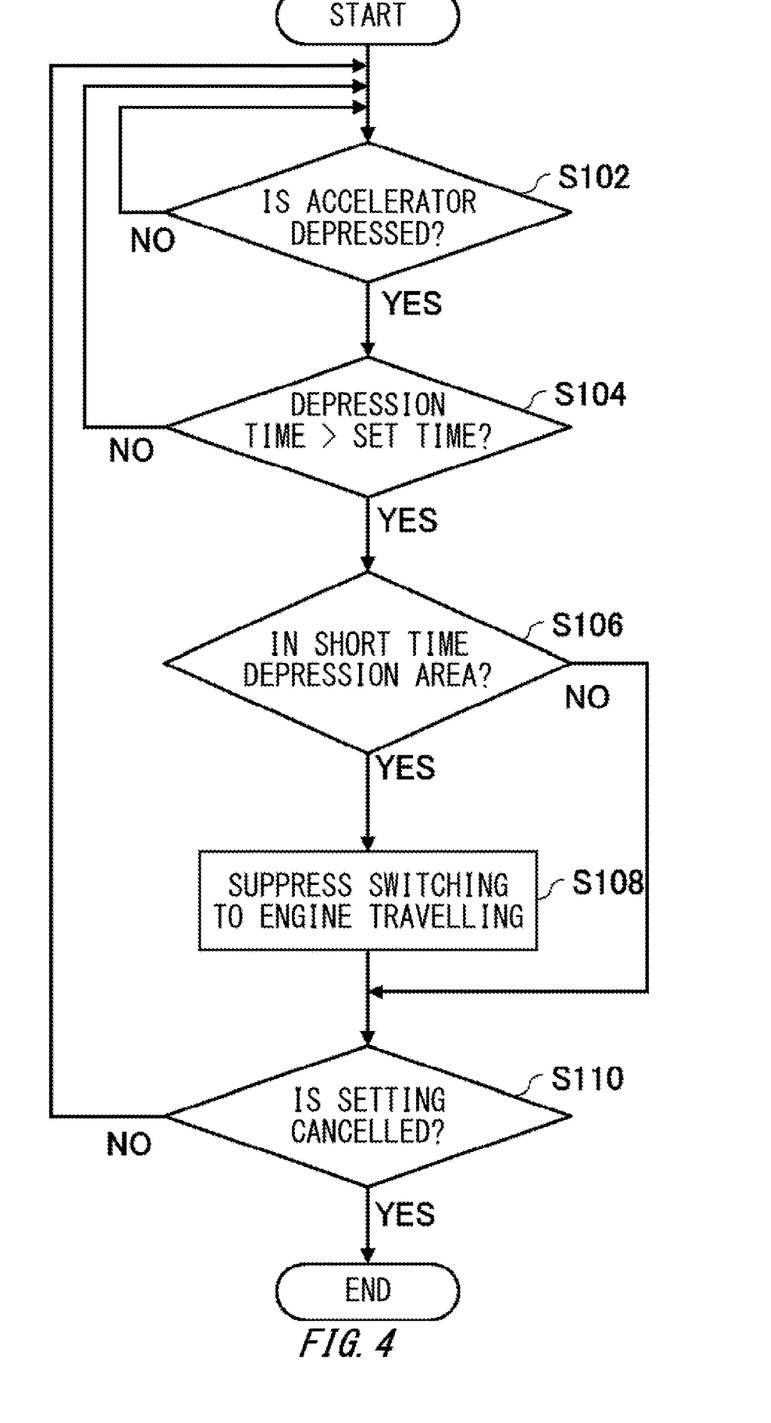
FIG. 4 schematically illustrates one example of a flow of processing by a switching suppression unit 210.

FIG. 4 schematically illustrates one example of processing by the switching suppression unit 210. Herein, a state in which the switching suppression unit 210 performs setting for suppressing the switching by the travelling control unit 206 according to a situation will be described as a starting state.

In step (step may be abbreviated as S for the description) 102, the switching suppression unit 210 determines whether the accelerator of its own vehicle is depressed. In a case where the accelerator is depressed, the processing proceeds to S104.

In S104, the switching suppression unit 210 determines whether the depression time of the accelerator exceeds a set time. In a case where the depression is ended before the depression time exceeds the set time, the processing returns to S102, and in a case where the depression time exceeds the set time, the processing proceeds to S106.

In S106, it is determined whether the position of its own vehicle is in the short time depression area. In a case where it is determined that the position is in the short time depression area, the processing proceeds to S108, and in a case where it is determined that the position is not in the short time depression area, the processing proceeds to S110. In S108, the switching suppression unit 210 suppresses the switching from the non-engine travelling to the engine travelling by the travelling control unit 206.

In S110, the switching suppression unit 210 determines whether the setting for suppressing the switching by the travelling control unit 206 is cancelled according to a situation. In a case where it is determined that the setting is not cancelled, the processing returns to S102, and in a case where it is determined that the setting is cancelled, the processing is ended.

Figure 5:
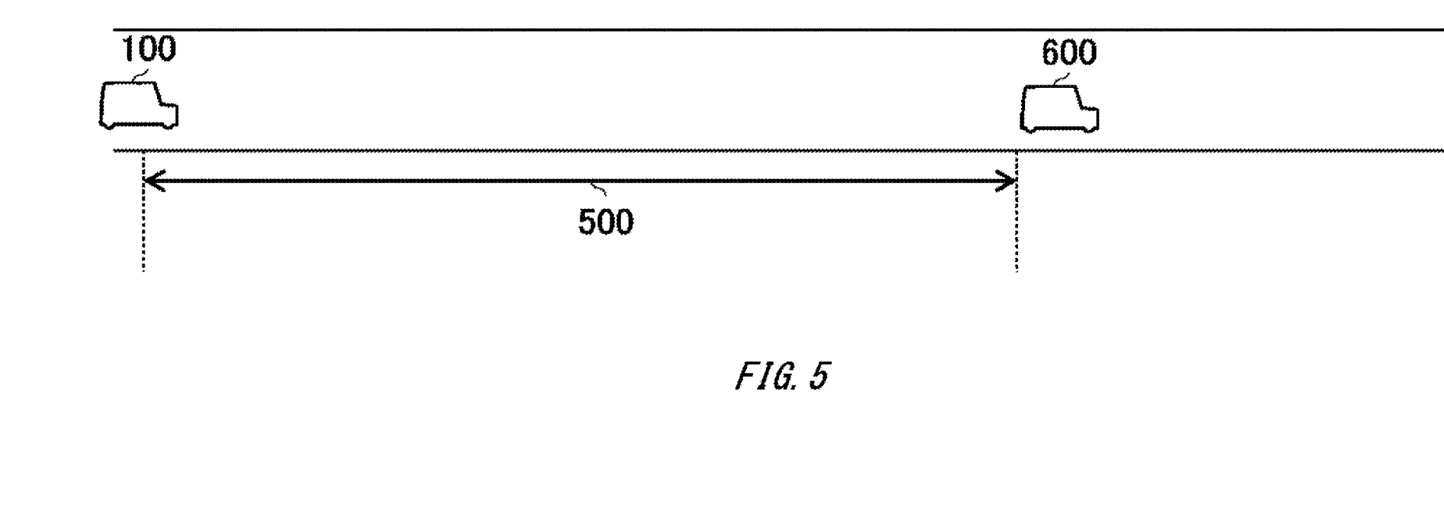
FIG. 5 is an explanatory diagram for describing the travelling control by the in-vehicle apparatus 200.

FIG. 5 schematically illustrates one example of the short time depression area 500 specified by the area specification unit 214. The area specification unit 214 may specify the short time depression area 500 based on a traffic situation ahead of its own vehicle.

The area specification unit 214 may specify the short time depression area based on a travelling speed of a vehicle 600 that travels ahead of its own vehicle. As a specific example, in a case where the vehicle 600 travelling ahead of its own vehicle decelerates, the area specification unit 214 specifies an area between the vehicle 600 and the target hybrid vehicle 100 as the short time depression area 500. In this manner, the switching from the non-engine travelling to the engine travelling can be avoided even after the driver of its own vehicle depresses the accelerator without realizing that the front vehicle has decelerated, and releases the depression since the its own vehicle approaches the front vehicle.

Information of the travelling speed of the vehicle 600 travelling ahead of its own vehicle may be received as needed by the information reception unit 204 from the management server 300, and may be stored in the information storage unit 202. In addition, the area specification unit 214 may specify the travelling speed of the vehicle 600 travelling ahead of its own vehicle based on the information acquired by the vehicle information acquisition unit 212. For example, the area specification unit 214 may specify the speed of the front vehicle 600 from the speed of its own vehicle and a relative speed between its own vehicle and the front vehicle 600 which is specified by analyzing the image captured by the camera 132.

Figure 6:
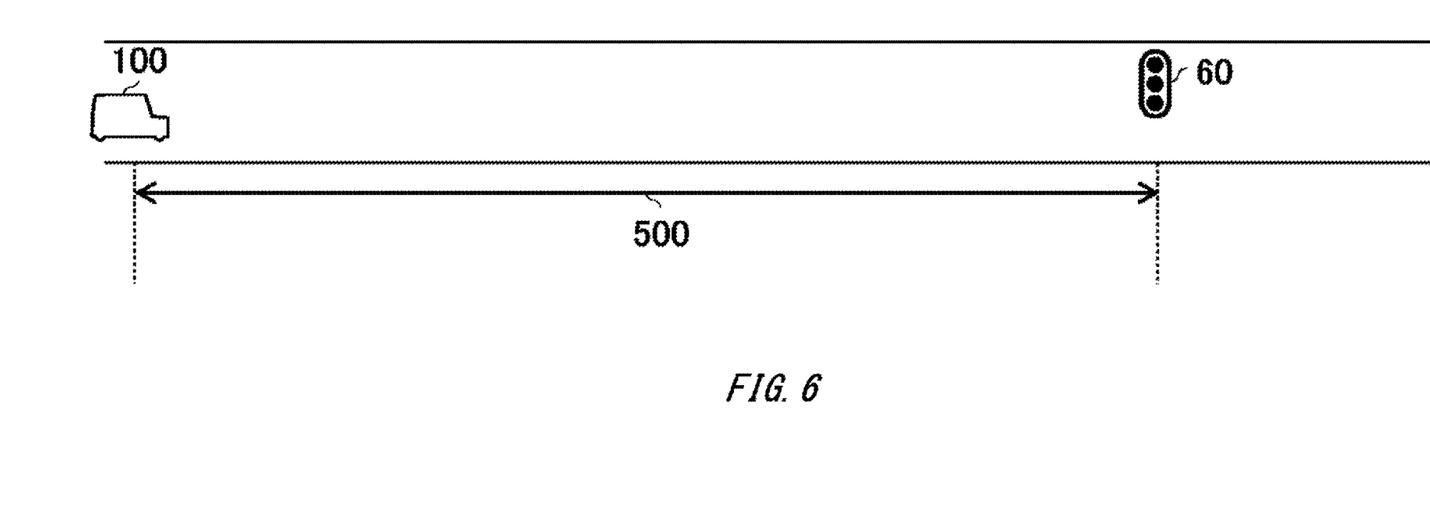
FIG. 6 is an explanatory diagram for describing the travelling control by the in-vehicle apparatus 200.

FIG. 6 schematically illustrates one example of the short time depression area 500 specified by the area specification unit 214. The area specification unit 214 may specify the short time depression area 500 based on a situation of the traffic light 60 ahead of its own vehicle.

As a specific example, in a case where the traffic light 60 ahead of its own vehicle is a red light, the area specification unit 214 specifies an area between the traffic light 60 and its own vehicle as the short time depression area. In this manner, in a situation where the driver of its own vehicle is not capable of visually checking the traffic light, the switching from the non-engine travelling to the engine travelling can be avoided even after the driver depresses the accelerator, and releases the depression since the driver realizes the red light. In addition, in a case where it is predicted that the traffic light 60 ahead of its own vehicle changes from a green light to a red light before its own vehicle passes therethrough, the area specification unit 214 specifies an area between the traffic light 60 and its own vehicle as the short time depression area 500. In this manner, the switching from the non-engine travelling to the engine travelling can be avoided even after the driver of its own vehicle depresses the accelerator so as to pass through the traffic light still indicating green, and releases the depression since the traffic light turns to red. Information of the traffic light 60 ahead of its own vehicle may be received as needed by the information reception unit 204 from the management server 300, and may be stored in the information storage unit 202. In addition, the area specification unit 214 may specify a situation of the traffic light 60 ahead of its own vehicle based on the information acquired by the vehicle information acquisition unit 212. For example, the area specification unit 214 specifies the situation of the traffic light 60 ahead of its own vehicle by analyzing the image captured by the camera 132.

Figure 7:
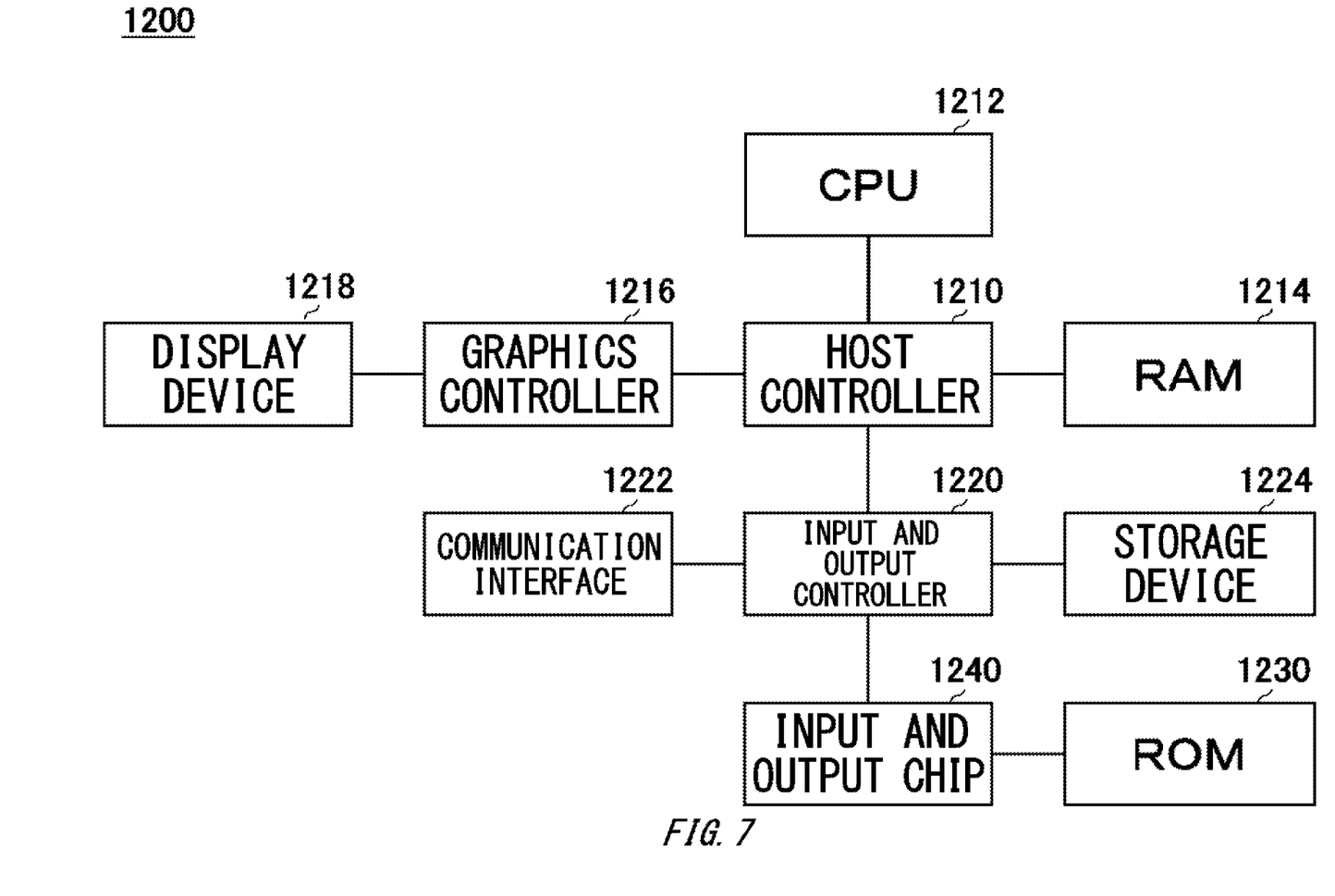
FIG. 7 schematically illustrates one example of a hardware configuration of a computer 1200 configured to function as the in-vehicle apparatus 200 or a management server 300.

FIG. 7 schematically illustrates one example of a hardware configuration of a computer 1200 configured to function as the in-vehicle apparatus 200. Programs installed in the computer 1200 can cause the computer 1200 to function as one or more "units" of the apparatuses according to the present embodiment or can cause the computer 1200 to execute operations associated with the apparatuses according to the present embodiment or the one or more "units", and/or can cause the computer 1200 to execute a process according to the present embodiment or steps of the process. Such programs may be executed by a central processing unit (CPU) 1212 in order to cause the computer 1200 to execute a specific operation associated with some or all of the flowchart and the blocks in the block diagrams described in the present specification.

The computer 1200 according to the present embodiment includes the CPU 1212, a RAM 1214, and a graphics controller 1216 which are mutually connected by a host controller 1210. The computer 1200 also includes a communication interface 1222, a storage device 1224, a DVD drive, and an input and output unit such as an IC card drive which are connected to the host controller 1210 via an input and output controller 1220. The DVD drive may be a DVD-ROM drive, a DVD-RAM drive, or the like. The storage device 1224 may be a hard disk drive, a solid state drive, or the like. The computer 1200 also includes a ROM 1230 and a legacy input and output unit such as a keyboard which are connected to the input and output controller 1220 via an input and output chip 1240.

The CPU 1212 operates according to the programs stored in the ROM 1230 and the RAM 1214, thereby controlling each unit. The graphics controller 1216 is configured to acquire image data generated by the CPU 1212 in a frame buffer or the like provided in the RAM 1214 or in itself, and cause the image data to be displayed on a display device 1218.

The communication interface 1222 communicates with other electronic devices via a network. The storage device 1224 stores programs and data used by the CPU 1212 in the computer 1200. The DVD drive reads the programs or the data from the DVD-ROM or the like and provides the programs or the data to the storage device 1224. The IC card drive reads programs and data from an IC card, and/or writes programs and data to the IC card.

The ROM 1230 stores therein boot programs or the like executed by the computer 1200 at the time of activation, and/or stores programs depending on hardware of the computer 1200. The input and output chip 1240 may also connect various input and output units to the input and output controller 1220 via a USB port, a parallel port, a serial port, a keyboard port, a mouse port, or the like.

The programs are provided via a computer-readable storage medium such as a DVD-ROM or an IC card. The programs are read from a computer-readable storage medium, installed in the storage device 1224, the RAM 1214, or the ROM 1230 which is also an example of the computer-readable storage medium, and executed by the CPU 1212. Information processing written in these programs is read by the computer 1200, and provides cooperation between the programs and the various types of hardware resources described above. An apparatus or a method may be configured by implementing operation or processing of information according to a use of the computer 1200.

For example, when communication is performed between the computer 1200 and an external device, the CPU 1212 may execute a communication program loaded in the RAM 1214, and instruct the communication interface 1222 to execute communication processing based on processing written in the communication program. The communication interface 1222, under the control of the CPU 1212, reads transmission data stored in a transmission buffer processing region provided in a recording medium such as the RAM 1214, the storage device 1224, the DVD-ROM, or the IC card, transmits the read transmission data to the network, or writes reception data received from the network into a reception buffer processing region or the like provided on the recording medium.

In addition, the CPU 1212 may cause all or necessary portion of a file or a database stored in the external recording medium such as the storage device 1224, the DVD drive (DVD-ROM), or the IC card, to be read by the RAM 1214, and execute various types of processing on the data on the RAM 1214. Next, the CPU 1212 may write back the processed data into the external recording medium.

Various types of programs and various types of information such as data, a table, and a database may be stored in the recording medium, and subjected to information processing. The CPU 1212 may execute, on the data read from the RAM 1214, various types of processing including various types of operations, information processing, conditional judgement, conditional branching, unconditional branching, information retrieval/replacement, or the like described in any part in the present disclosure and specified by instruction sequences of the programs, and writes back the results into the RAM 1214. In addition, the CPU 1212 may retrieve information in a file, a database, or the like in the recording medium. For example, when a plurality of entries each having an attribute value of a first attribute associated with an attribute value of a second attribute are stored in the recording medium, the CPU 1212 may retrieve, out of the plurality of entries, an entry with the attribute value of the first attribute specified that meets a condition, read the attribute value of the second attribute stored in the entry, and thereby acquire the attribute value of the second attribute associated with the first attribute meeting a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, so that the programs are provided to the computer 1200 via the network.

The flowchart and the blocks in the block diagrams according to the present embodiment may represent a step of a process in which an operation is executed or a "unit" of an apparatus which has a role of executing an operation. A specific step and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include a digital and/or analog hardware circuit, or may include an integrated circuit (IC) and/or a discrete circuit. The programmable circuit may include, for example, a reconfigurable hardware circuit including logical AND, logical OR, logical XOR, logical NAND, logical NOR, and other logical operations, and a flip-flop, a register, and a memory element, such as a field programmable gate array (FPGA) and a programmable logic array (PLA).

The computer-readable storage medium may include any tangible device capable of storing an instruction executed by an appropriate device, so that the computer-readable storage medium having the instruction stored thereon constitutes a product including an instruction that may be executed in order to provide means to execute an operation specified by a flowchart or a block diagram. Examples of the computer-readable storage medium may include an electronic storage medium, a magnetic storage medium, an optical storage medium, an electromagnetic storage medium, a semiconductor storage medium, or the like. More specific examples of the computer-readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus locally or via a local area network (LAN), a wide area network (WAN) such as the Internet or the like in order that the general-purpose computer, the special-purpose computer, or the processor or the programmable circuit of another programmable data processing apparatus is to execute the computer-readable instruction to provide means to execute operations specified by the flowchart or the block diagram. Examples of the processor include a computer processor, a processing unit, a microprocessor, a digital signal processor, a controller, a microcontroller, or the like.

While the present invention has been described by way of the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system, 20 network, 30 slope, 60 traffic light, 100 hybrid vehicle, 110 tank, 112 engine, 120 battery, 122 motor, 130 sensor, 132 camera, 200 in-vehicle apparatus, 202 information storage unit, 204 information reception unit, 206 travelling control unit, 208 depression detection unit, 210 switching suppression unit, 212 vehicle information acquisition unit, 214 area specification unit, 300 management server, 400 traffic management system, 500 short time depression area, 600 vehicle, 1200 computer, 1210 host controller, 1212 CPU, 1214 RAM, 1216 graphics controller, 1218 display device, 1220 input and output controller, 1222 communication interface, 1224 storage device, 1230 ROM, 1240 input and output chip

What is claimed is:

1. A control apparatus comprising:
a travelling control unit configured to control an engine travelling and a non-engine travelling of a hybrid vehicle, and perform switching from the non-engine travelling to the engine travelling in a case where a depression time of an accelerator of the hybrid vehicle exceeds a preset set time while the hybrid vehicle travels based on the non-engine travelling;
a switching suppression unit configured to suppress the switching from the non-engine travelling to the engine travelling by the travelling control unit while the hybrid vehicle travels in a short time depression area registered as an area where depression of the accelerator does not continue for a period equal to or longer than the set time; and
an area specification unit configured to specify the short time depression area, wherein the area specification unit is configured to specify the short time depression area based on map information including a terrain of a road.

2. The control apparatus according to claim 1, wherein the switching suppression unit is configured to prohibit the switching from the non-engine travelling to the engine travelling by the travelling control unit while the hybrid vehicle travels in the short time depression area.

3. The control apparatus according to claim 2, wherein the switching suppression unit is configured to decide whether the switching from the non-engine travelling to the engine travelling by the travelling control unit is suppressed according to a speed of the hybrid vehicle.

4. The control apparatus according to claim 2, wherein the switching suppression unit is configured to decide whether the switching from the non-engine travelling to the engine travelling by the travelling control unit is suppressed according to an acceleration of the hybrid vehicle.

5. The control apparatus according to claim 1, wherein the switching suppression unit is configured to perform control to set the set time to be longer while the hybrid vehicle travels in the short time depression area as compared with a case where the hybrid vehicle travels in an area other than the short time depression area.

6. The control apparatus according to claim 1, wherein the area specification unit is configured to specify the short time depression area based on depression statistics information including depression positions of accelerators and depression times of the accelerators by a plurality of hybrid vehicles.

7. The control apparatus according to claim 6, wherein the area specification unit is configured to specify the short time depression area based on a traffic situation ahead of the hybrid vehicle.

8. The control apparatus according to claim 1, wherein the area specification unit is configured to specify the short time depression area based on a traffic situation ahead of the hybrid vehicle.

9. The control apparatus according to claim 8, wherein the area specification unit is configured to specify the short time depression area based on a travelling speed of a vehicle travelling ahead of the hybrid vehicle.

10. The control apparatus according to claim 8, wherein the area specification unit is configured to specify the short time depression area based on a situation of a traffic light ahead of the hybrid vehicle.

11. The control apparatus according to claim 1, wherein the switching suppression unit is configured to decide whether the switching from the non-engine travelling to the engine travelling by the travelling control unit is suppressed according to a speed of the hybrid vehicle.

12. The control apparatus according to claim 1, wherein the switching suppression unit is configured to decide whether the switching from the non-engine travelling to the engine travelling by the travelling control unit is suppressed according to an acceleration of the hybrid vehicle.

13. The control apparatus according to claim 12, wherein, when the depression time of the accelerator of the hybrid vehicle exceeds the set time while the hybrid vehicle travels in the short time depression area, the switching suppression unit is configured to suppress the switching from the non-engine travelling to the engine travelling by the travelling control unit in a case where the acceleration of the hybrid vehicle is lower than a predetermined acceleration threshold, and the switching suppression unit is configured not to suppress the switching from the non-engine travelling to the engine travelling by the travelling control unit in a case where the acceleration of the hybrid vehicle is higher than the acceleration threshold.

14. A system comprising:
the control apparatus according to claim 1; and
a management server configured to specify the short time depression area, wherein the control apparatus is configured to receive information of the short time depression area from the management server.

15. A non-transitory computer-readable storage medium storing a program for causing a computer to function as:
- a travelling control unit configured to control an engine travelling and a non-engine travelling of a hybrid vehicle, and perform switching from the non-engine travelling to the engine travelling in a case where a depression time of an accelerator of the hybrid vehicle exceeds a preset set time while the hybrid vehicle travels based on the non-engine travelling;
- a switching suppression unit configured to suppress the switching from the non-engine travelling to the engine travelling by the travelling control unit while the hybrid vehicle travels in a short time depression area registered as an area where depression of the accelerator does not continue for a period equal to or longer than the set time; and
- an area specification unit configured to specify the short time depression area, wherein the area specification unit is configured to specify the short time depression area based on map information including a terrain of a road.

16. A control apparatus comprising:
- a processor and a non-transitory, computer-readable storage medium storing instructions which when executed by the processor causes the apparatus to be configured to:
- control an engine travelling and a non-engine travelling of a hybrid vehicle, and perform switching from the non-engine travelling to the engine travelling in a case where a depression time of an accelerator of the hybrid vehicle exceeds a preset set time while the hybrid vehicle travels based on the non-engine travelling;
- suppress the switching from the non-engine travelling to the engine travelling while the hybrid vehicle travels in a short time depression area registered as an area where depression of the accelerator does not continue for a period equal to or longer than the set time; and
- further specify the short time depression area based on map information including a terrain of a road.

* * * * *